(12) United States Patent
Kaneko

(10) Patent No.: US 6,585,446 B2
(45) Date of Patent: Jul. 1, 2003

(54) MECHANISM FOR ADJUSTABLE INSTALLATION OF PLATE-LIKE MEMBER

(75) Inventor: Koji Kaneko, Ohmiya (JP)

(73) Assignee: Fuji Photo Optical Co., Ltd. (JP)

(*) Notice: Subject to any disclaimer, the term of this patent is extended or adjusted under 35 U.S.C. 154(b) by 68 days.

(21) Appl. No.: 09/768,883

(22) Filed: Jan. 24, 2001

(65) Prior Publication Data
US 2001/0016147 A1 Aug. 23, 2001

(30) Foreign Application Priority Data
Feb. 7, 2000 (JP) .................................. 2000-028500

(51) Int. Cl.⁷ .............................................. F16H 53/00
(52) U.S. Cl. ...................... 403/374.1; 403/13; 403/343; 403/DIG. 8; 250/491.1; 74/567; 74/569; 382/321
(58) Field of Search .......................... 403/DIG. 8, 13, 403/14, 320, 343, 374.1, 374.2, 374.3, 374.4; 74/567, 569; 250/491.1; 382/321

(56) References Cited

U.S. PATENT DOCUMENTS

| | | | | |
|---|---|---|---|---|
| 3,553,359 A | * | 1/1971 | Dixon et al. | |
| 3,631,248 A | * | 12/1971 | Johnson | |
| 3,652,146 A | * | 3/1972 | George | |
| 4,193,317 A | * | 3/1980 | Oono et al. | |
| 4,205,634 A | * | 6/1980 | Tourtelot, Jr. | 74/567 X |
| 4,299,377 A | * | 11/1981 | Lenz | |
| 4,334,132 A | * | 6/1982 | Poole | |
| 5,415,138 A | * | 5/1995 | Hudson | |
| 5,515,182 A | * | 5/1996 | Lehman et al. | |
| 5,712,471 A | * | 1/1998 | Bremer | |
| 5,872,354 A | * | 2/1999 | Hanson | |

FOREIGN PATENT DOCUMENTS

| | | |
|---|---|---|
| JP | 05033108 | 2/1993 |
| JP | 0533108 | 4/1993 |

OTHER PUBLICATIONS

U.S. application No. 09/879,012, filed Jun. 12, 2001, entitled Mechanism for Adjustable Installation of Band Plate–Like Member.
U.S. application No. 09/737,075, filed Dec. 13, 2000, entitled Adjusting Mechanism for Installation of Plate–Like Members.

* cited by examiner

Primary Examiner—Lynne H. Browne
Assistant Examiner—Ryan Flandro
(74) Attorney, Agent, or Firm—Price, Heneveld, Cooper, DeWitt & Litton (57) ABSTRACT

An adjustment system for a plate-like member includes a cam member formed with an appropriate cam curve in contact with front or rear surface of, for example, a reflector installed in an optical scanner to reflect a scanning beam of an optical scanner so that a reflecting direction of this reflector may be adjustably varied by rotating the cam member and optical and scanning characteristics of the optical scanner may be ensured.

8 Claims, 9 Drawing Sheets

MECHANISM FOR ADJUSTABLE INSTALLATION OF PLATE-LIKE MEMBER

BACKGROUND OF THE INVENTION

1. Field of the Invention

The present invention relates to a mechanism for adjustable installation of a plate-like member, particularly a plate-like member such as a reflector in order to make an effective surface of this member facing in a desired direction and more particularly to such mechanism suitable to adjust the direction in which the effective surface of an optical scanner's reflector faces.

2. Description of the Related Art

An optical scanner used in an image forming apparatus such as copying machine or printer is generally arranged so that a laser beam emitted from a laser source and containing image information is appropriately toned, then enters deflector means such as a polygon mirror and the laser beam thus deflected irradiates and scans an image carrier as an object to be scanned, for example, a photosensitive drum and forms an electrostatic latent image on this image carrier. This electrostatic latent image is developed with toner to form a toner image, which is then transferred to a transfer medium such as recording paper to form a visible image thereon. As color image forming apparatus, for example, color copying machine or color printer, the image forming apparatus of tandem type has been widely used. In the image forming apparatus of this type, a plurality of image carriers such as photosensitive drums are arranged side by side so that electrostatic latent images may be formed on the respective image carriers as the laser beams containing the image data colored in yellow (Y), magenta (M), cyan (C) and black (BK), respectively, irradiate and scan said respective image carriers. These electrostatic latent images are developed by respective particular kinds of toner to form respective toner images which are then successively transferred to the transfer medium such as recording paper travelling in the direction of the image carriers' side by side arrangement to form color images thereon.

Demand for pluralization of the light beam for scanning and the scanning unit has increased as high-speed copying machines and printers have come widely in use. Additionally, in order to ensure the formed image to be distinct, optical characteristics of these plural scanning light beams as well as the scanning characteristics of these plural scanning units must meet the predetermined requirements and the characteristics of these plural units must be uniform. To ensure the required optical characteristics and the scanning characteristics, installation precision of the optical members constituting the optical scanner must be sufficiently high to achieve the proper operative association one with another. Particularly, even a slight error in the reflecting direction of the reflector or variation in the installed state will deteriorate the optical characteristics as well as the scanning characteristics. To avoid such problems, the reflecting direction of the reflector should be adjusted to a high precision.

The mechanism for adjustable installation of a reflector is well known, in which the spacer as thin as possible, for example, a mica plate is disposed between the reflector and the bracket on which the reflector is mounted and thereby said reflector is adjustably tilted. As an example of such mechanism, so-called mirror adjusting mechanism is described in Japanese Utility Model Application Disclosure Gazette No. 1993-33108. This mirror adjusting mechanism of prior art comprises: a mirror frame; a supporting piece mounted on an end of said mirror frame so that said supporting piece may bear against a reflective surface of a mirror; an adjusting plate is rotatably mounted on said adjusting plate so that said adjusting plate may bear against said reflective surface of said mirror; an adjusting member mounted on said adjusting plate to adjust an angular position of said adjusting plate; and a biasing member adapted to bear against a rear surface of said mirror frame and thereby to bias said mirror. Said adjusting plate is adjustably rotated by said adjusting member to swing the mirror around its longitudinal axis and thereby to change a direction in which the reflective surface thereof faces.

These conventional adjusting mechanisms as have been described above are inevitably accompanied with problems. In the case of the mechanism adapted to tilt the reflector by interposition of the spacer, it is certainly possible to adjust a tilt of the reflector omni-directionally. However, the extremely thin spacer makes operation of adjustment troublesome. In addition, a clamping force of the set screw used to fix the reflector is not constant and consequently it is sometimes impossible to make the reflector face in the desired direction, in spite of interposition of said spacer. In other words, no quantitative adjustment is impossible and the adjusting effect may largely depend on working accuracy of the components such as the spacer, the reflector and the brackets.

The mirror adjusting mechanism described in said Japanese Utility Model Application Disclosure Gazette No. 1993-33108 is adapted to rotate the adjusting plate by screwing-in or out an adjusting screw and by adjusting a movement of the adjusting screw back and forth, no fine adjustment is possible since the adjustment largely depends on a pitch of the adjusting screw.

While it may be contemplated to use an eccentric pin as the adjusting member to perform such adjustment, a variation occurring in a tilt of the plate-like member every time the operation of adjustment is carried out is too large to meet the recently demanded requirements for the high precision of adjustment.

SUMMARY OF THE INVENTION

In view of the problems as have been described above, it is a principal object of the present invention to provide a mechanism for adjustable installation of a plate-like member particularly suitable for a reflector in an optical scanner improved so that not only the quantitative adjustment but also a fine adjustment can be achieved.

The object set forth above is achieved, according to an aspect of this invention, by a mechanism for adjustable installation of a plate-like member comprising a cam member located at one of longitudinally opposite ends of said plate-like member aside to one of transversely opposite ends of said plate-like member so that a cam curve of said cam member may be normally kept in contact with one surface of said plate-like member, said plate-like member is pivotally supported at the other of said transversely opposite ends, biasing means adapted to bias said other surface so that said one surface may be normally kept in contact with said cam curve and actuator means adapted to rotate said cam member and thereby to alter a position of the plate-like member at which said cam curve comes in contact with said one surface.

The position of the plate-like member at which the cam curve comes in contact with the plate-like member is changed as said cam member is rotatably driven by said actuator means, With a consequence, one of the transversely opposite side edges of said plate-like member has its position changed and the direction in which the effective surface of said plate-like member faces is also changed. Under the effect of the biasing means, the plate-like member is normally kept in contact with the cam curve and reliably moved by said cam curve. Movement of the plate-like member by the cam curve advantageously enables the adjustable installation of said plate-like member to be continuously and finely achieved so far as said cam curve is appropriately configured.

According to one preferred embodiment of this invention said cam member moves in the axial direction of its rotational shaft as said cam member rotates.

In the case of the cam curve configured so as to intersect a plane orthogonal to the rotational axis of the cam member, the position of the plate-like member at which the latter comes in contact with the cam curve inevitably varies as the cam member rotates. For such arrangement, there is an apprehension that a position variation for the adjustable installation of the plate-like member might be unstable. The arrangement of the invention eliminates such apprehension by moving the cam member in the direction of its rotational axis in accordance with the configuration of the cam curve and thereby ensuring the constant position of the plate-like member at which the latter comes in contact with the cam curve. In this way, the position variation for the adjustable installation of the plate-like member can be reliably stabilized.

According to another preferred embodiment of this invention, said actuator means comprises an actuator screw engaged with said cam member, said actuator screw having its feed direction substantially coincident with said rotational shaft of said cam member and being formed with an appropriate cam curve, and said mechanism further comprises a guide member adapted to be engaged with said cam curve.

Rotation of the actuator screw causes the cam member engaged with said actuator screw to move back or forth depending on the direction in which said actuator screw is rotated. The cam member moves back or forth as it is rotated under a restriction by said cam curve with which the guide member is engaged. Rotation of the cam member continuously varies the position of the plate-like member at which the latter comes in contact with the cam curve formed in the cam member and thereby adjustably varies the state in which said plate-like member is installed. In addition, said position can be maintained constant so far as the cam curve of the cam member is appropriately configured.

The object set forth above is achieved, according to another aspect of this invention, by a mechanism for adjustable installation of a plate-like member comprising a pair of cam members located at one of longitudinally opposite ends of said plate-like member so that respective cam curves of said cam members may be normally kept in contact with one surface of said plate-like member, biasing means adapted to bias said other surface so that said one surface may be normally kept in contact with said cam curves, and actuator means adapted to rotate said cam members and thereby to alter positions of the plate-like member at which said cam curves come in contact with said one surface.

Specifically, the respective cam curves of said cam members come in contact with the plate-like member at its transversely opposite ends on one of its longitudinally opposite ends. In this way, the installation of the plate-like member can be adjusted at its transversely opposite side edges more finely than in the case of the single cam member.

According to one preferred embodiment of this invention on said another aspect, said pair of cam members have their rotational shafts extending substantially in parallel to each other so that transmission means may transmit rotation of the one cam member to the other cam member and cause said other cam member to rotate in synchronization with said one cam member.

According to another preferred embodiment of this invention, said transmission means is provided in the form of a gear system or a belt gearing system.

Rotation of the one cam member is transmitted to the other cam member by said transmission means so that said other cam member is rotated synchronization with said one cam member. It is unnecessary to actuate the pair of cam members separately and the operation of adjustment is correspondingly simplified. The pair of cam members is preferably arranged so that the axes of these cam members may extend substantially in parallel to the longitudinal direction of the plate-like member. The transmission means may be selected from a belt gear system, a gear system and the like.

According to still another preferred embodiment of this invention, said pair of cam members are coaxial to each other and have different cam curves, respectively, so that these cam members may be rotatably driven by said actuator means.

The shaft supporting the pair of cam members may be rotated to rotate these cam members together. The respective cam members have the cam curves of different configurations and therefore the plate-like member is differentially moved at its transversely opposite side edges as said pair of cam members are rotated. The direction in which the effective surface of the plate-like member faces can be varied by such differential movement. It should be understood that said axis preferably extends substantially in parallel to the transverse direction of the plate-like member.

According to further another preferred embodiment of this invention, said pair of cam members have the cam curves which are identical to each other but phase-shifted from each other so that these cam members may be rotatably driven by said actuator means.

Compared to the case in which the respective cam members have the cam curves configured differentially from each other, combination of the cam members having the respective cam curves identically configured requires less time and labor for working of them and facilitates the quality control thereof.

According to an additional preferred embodiment of this invention, said cam members move in the axial direction of their rotational shafts as said cam members rotate.

According to further additional preferred embodiment of this invention, said actuator means comprises an actuator screw engaged with one of said cam members, said actuator screw having its feed direction substantially coincident with said rotational shafts of said cam members and at least one of said pair of cam members being formed with an appropriate cam curve, and wherein said mechanism further comprises a guide member adapted to be engaged with said cam curve.

According to still additional preferred embodiment of this invention, the casing adapted to receive said cam member(s) is movable in the direction orthogonal to the longitudinal direction of said plate-like member.

The cam members and therefore the cam curves thereof have their positions varied as the cam members move transversely of the longitudinal direction of the plate-like member. Thus the positions at which the plate-like member comes in contact with the respective cam curves. In this way, said plate-like member can be moved, for example, in the direction orthogonal to the surface of said plate-like member or transversely of said plate-like member. By moving the plate-like member in such direction, the position of the plate-like member relative to the remaining parts can be easily adjusted. Particularly in the optical sensor, the optical path length can be easily adjusted and the desired optical properties can be easily ensured. After has been moved in this manner, the cam member may be further rotated to adjust the state of the installation.

According to a preferred specific embodiment of this invention, further comprising follower rod(s) each having one end adapted to be normally kept in contact with said cam curve(s) of said cam member(s) and the other end adapted to be normally kept in contact with said plate-like member.

Assumed that the cam member itself is made of a thin plate or the like contoured by the cam curve, the plate-like member can be stably adjusted since a substantial point-contact is established between the cam curve and the plate-like member. However, there is an apprehension that the thin plate might suffer from a shortage of its strength. To overcome this problem, the cam member is shaped in a cylinder or the like formed on its outer surface with the cam curve so that one end of said follower rod may be normally kept in contact with said cam curve and the other end may be normally kept in contact with the plate-like member. In this way, the point-contact is established between the cam curve and the plate-like member by said follower rod extending between these two member and thereby operation of said plate-like member can be stabilized.

According to another preferred specific embodiment, said plate-like member is a reflector installed within an optical apparatus.

By providing the reflector in the optical scanner with the mechanism according to this invention, the reflecting direction of this reflector can be easily and quantitatively adjusted. The state in which the reflector is installed in the optical scanner can be thereby adjusted with a high precision and the desired various factors of the optical scanner such as the optical characteristics and the scanning characteristics can be ensured and maintained.

DETAILED DESCRIPTION OF THE EMBODIMENTS

The mechanism for adjustable installation of the plate-like member according to the invention will be more fully understood from the description of the preferred embodiments given hereunder in reference with the accompanying drawings. These embodiments will be described with respect to the case in which the bans plate-like member takes the form of a reflector in the optical scanner and more particularly with respect to the optical scanner including the reflector provided with this adjusting mechanism.

Figure 1:
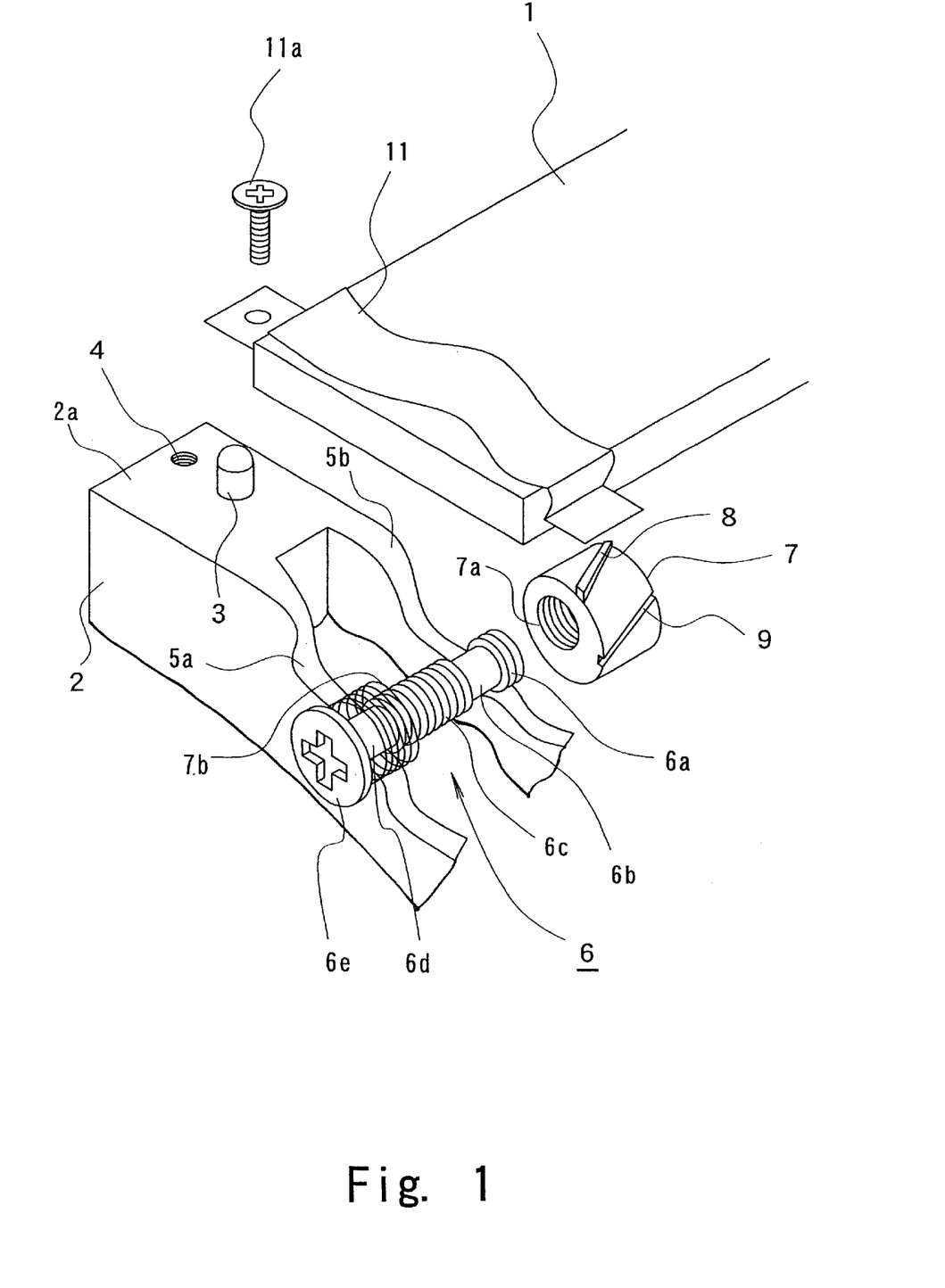
FIG. 1 is an exploded perspective view schematically illustrating an important construction in a first embodiment of the mechanism for adjustable installation of the plate-like member according to the invention.
Figure 3:
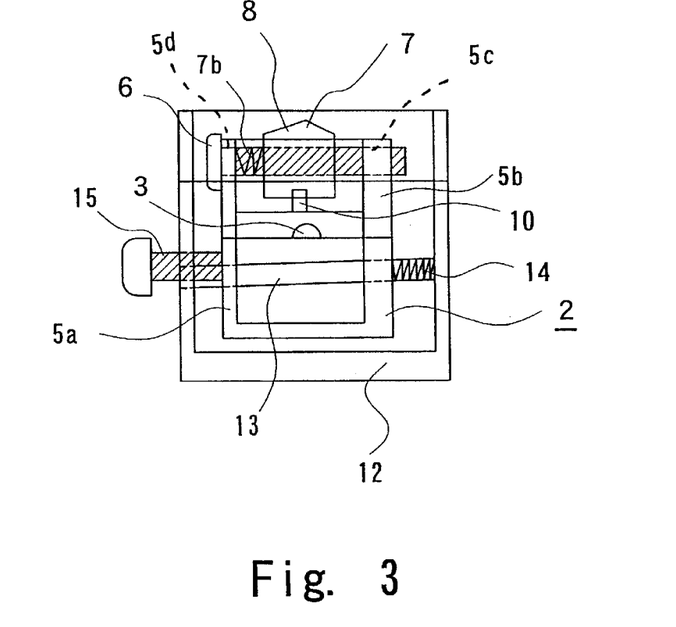
FIG. 3 is a right side view illustrating the mechanism for adjustable installation of FIG. 2.

As best seen in FIG. 1, a plate-like member in the form of a reflector 1 has its one end lying adjacent a casing 2. The casing 2 is provided on its supporting surface 2a with a supporting protrusion 3 and said supporting surface 2a is formed with a female threaded hole 4. A pair of supporting walls 5a, 5b spaced from each other by an appropriate distance are formed integrally with one end of said supporting surface 2a. Of these supporting walls 5a, 5b, the inner one, i.e., the supporting wall 5b lying aside to the middle of the reflector 1 is formed with a female thread 5c (FIG. 3) and the outer supporting wall 5a is formed at its position in alignment with said female threaded hole with a through-hole 5d (FIG. 3). An actuator screw 6 extends through the through-hole and female threaded hole. This actuator screw 6 is formed at its distal end with a male thread 6a adapted to be engaged with said female threaded hole (not shown) formed in said supporting wall 5b. A distal side neck 6b extends behind said male thread 6a, said neck 6b being diameter-reduced with respect to said male thread 6a and appropriately longer than a thickness of said supporting wall 5b. Behind said neck 6b, the actuator screw 6 is formed with an actuator threaded portion 6c in the form of a male thread and behind this actuator threaded portion 6c a proximal side neck 6d appropriately longer than said actuator threaded portion 6c extends and terminates at a head 6e.

Said actuator threaded portion 6c of the actuator screw 6 is adapted to be engaged with a female threaded hole 7a formed in a cylindrical cam body 7. This female threaded hole 7a is appropriately eccentric with respect to a central axis of the cylindrical cam body 7 so that said cam body 7 may function as an eccentric cam as it is rotated around the actuator screw 6. The cam body 7 is provided on its outer peripheral surface with a cam ridge 8 protruding therefrom and longitudinally extending at an appropriate angle with respect to the generatrix of said cam body 7. In the case of the cam body 7 in the form of an eccentric cam, an outer peripheral surface of said cam ridge 8 could describe a desired cam curve even when said cam ridge 8 has a uniform thickness. On the other hand, in the case of the cam body 7 supported by the actuator threaded portion 6*c* not in eccentric manner, a thickness of said cam ridge 8 may be continuously varied in its longitudinal direction to obtain the desired cam curve defined by the outer peripheral surface of said cam ridge 8.

The outer peripheral surface of said cam body 7 is formed at its appropriate position with a cam groove 9 longitudinally extending at an appropriate angle with respect to the generatrix of said cam body 7 and having an appropriate depth. Said casing 2 is provided on its appropriate position with a guide pin 10 serving as a guide member adapted to be inserted into said cam groove 9 and engaged therewith as best seen in FIG. 3. This guide pin 10 is biased by suitable means to be engaged with said cam groove 9 so that said guide pin 10 can not be disengaged from said cam groove 9 even when the cam body 7 is rotated.

The reflector 1 is placed on the casing 2 with one of transversely opposite sides of said reflector 1 bearing against said supporting protrusion 3 and the other side bearing against the cam ridge 8 of said cam body 7. In this state, a counter spring 11 biases the reflector 1 from above. Said counter spring 11 has its one end secured to the casing 2 by screwing-in a set screw 11*a* into engagement with said female threaded hole 4 formed in the supporting surface 2*a* of said casing 2. The reflector 1 is biased by said counter spring 11 to bear against the supporting protrusion 3, on one hand, and against the cam ridge 8, on the other hand. Between the supporting wall 5*a* and the cam body 7, the actuator screw 6 is loaded with an one-side biasing spring 7*b* in the form of a compression coil spring so that a backlash possibly occurring between the female threaded hole 7*a* and the actuator threaded potion 6*c* is eliminated under the biasing effect of said one-side biasing spring 7*b*.

Figure 2:
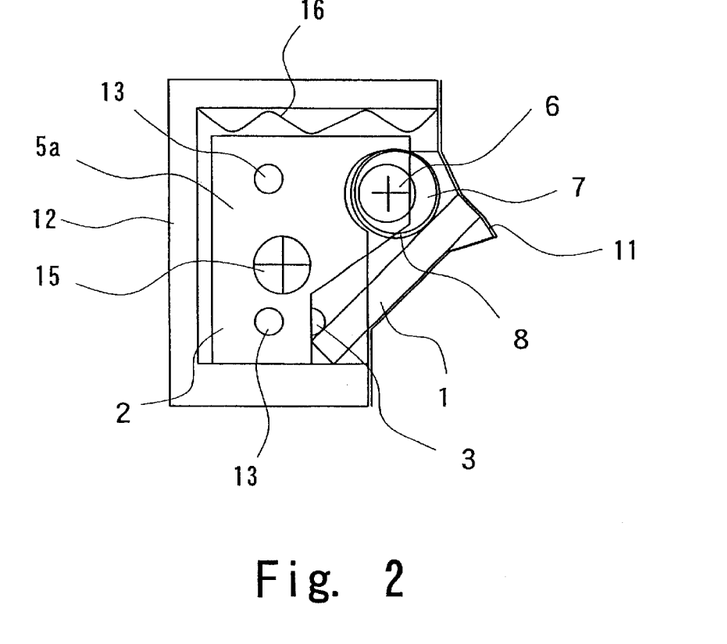
FIG. 2 is a front view schematically illustrating said important construction in said first embodiment of the mechanism for adjustable installation.
Figure 4:
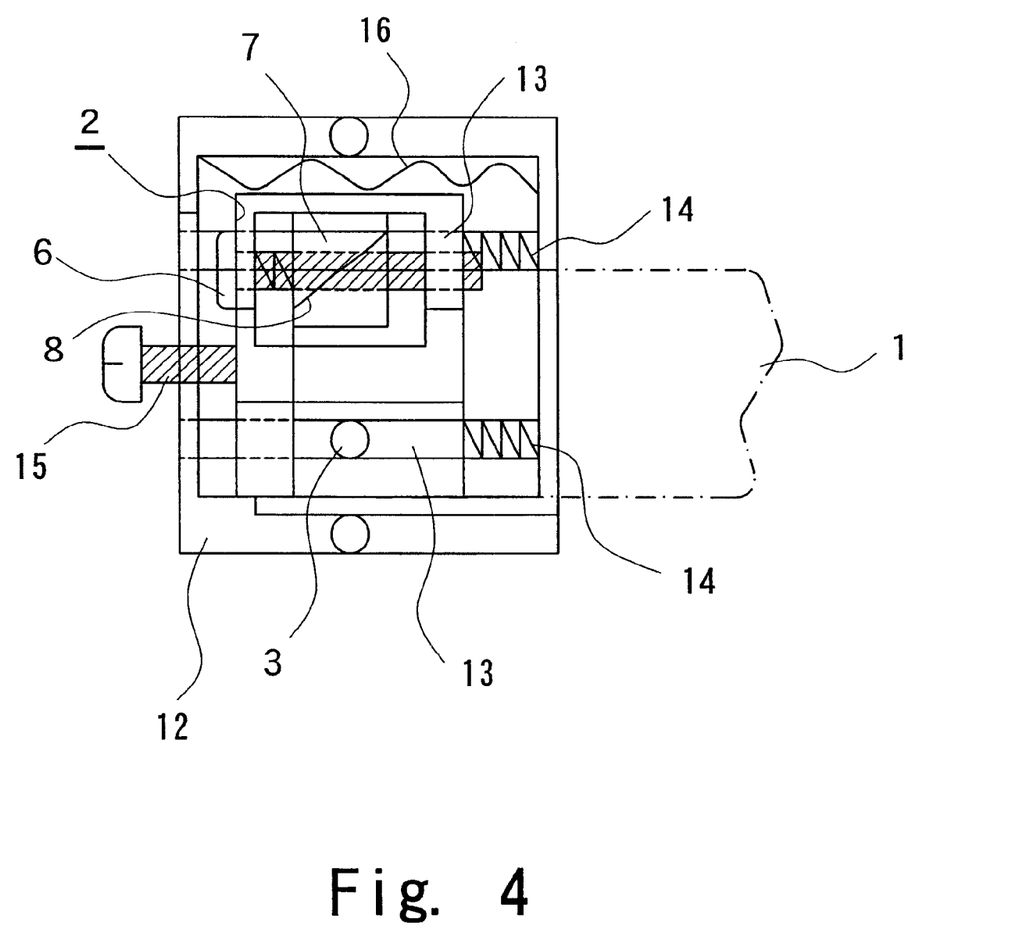
FIG. 4 is a plan view illustrating the mechanism for adjustable installation of FIG. 2.

As illustrated by FIGS. 2, 3 and 4 said casing 2 is held within a case holder 12. A pair of guide's rods 13 extending at an angle with respect to the longitudinal direction of the reflector 1 is supported by walls lying on both sides of the casing 2. The casing 2 is formed with through-holes (not shown) into which said guide rods are separately inserted so that the casing 2 may be slidably supported by these guide rods. 13. As illustrated by FIGS. 3 and 4, a pair of return springs 14 are disposed between respective adjacent walls of the casing 2 and the case holder 12 so that these return springs 14 bias the casing 2 to move in one direction relative to the case holder 12. A driving screw 15 extends through the wall of the case holder 12 opposed to the wall provided with said return springs 14 and has its distal end bearing against the casing 2. The case holder 12 further holds therein an one-side biasing spring 16 adapted to bias the casing 2 to put aside to an appropriate position within said case holder 12.

Now a manner will be discussed, in which the novel mechanism for adjustable installation of the reflector 1 as has been described above is operated to install the reflector 1.

The actuator screw 6 is inserted into the through-hole 5*d* (FIG. 3) and then located with said one-side biasing spring 7*b* therearound. The actuator-threaded portion 6*c* of this actuator screw 6 is then engaged with the cam body 7 and said male thread 6*a* is engaged with the female threaded hole of the supporting wall 5*b*. Said male thread 6*a* is further advanced through said female threaded hole until said distal side neck 6*b* is received in said female threaded hole and said proximal side neck 6*d* is received in the through-hole of the supporting wall 5*a*. In this manner, the actuator screw 6 and cam body are supported between the supporting walls 5*a*, 5*b* with the guide pin 10 inserted into the cam groove 9 of the cam body 7. Said guide rods 13 are inserted through the wall of said case holder 12 and the casing 2 and thereby said casing 2 is held by the case holder 12. The reflector 1 is placed so as to bear against the supporting protrusion 3 of the casing 2 and against the cam ridge 8 and biased from above by said counter spring 11. Said counter spring 11 is secured to the casing 2 by the set screw 11*a* and thereby the reflector 1 is fixed.

Figure 5:
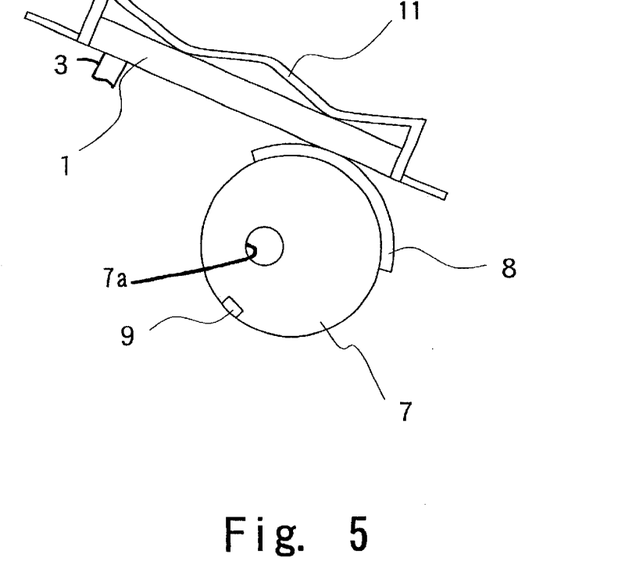
FIG. 5 is a front view illustrating a manner in which the first embodiment of the mechanism for adjustable installation operates.
Figure 6:
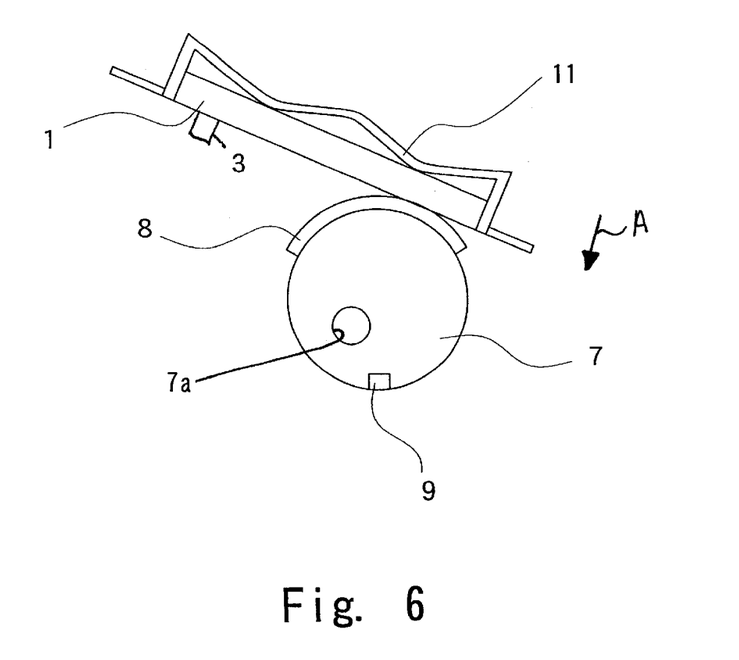
FIG. 6 is a front view illustrating a manner in which the first embodiment of the adjusting mechanism operates as the mechanism is in a state different from the state illustrated in FIG. 5.
Figure 7:
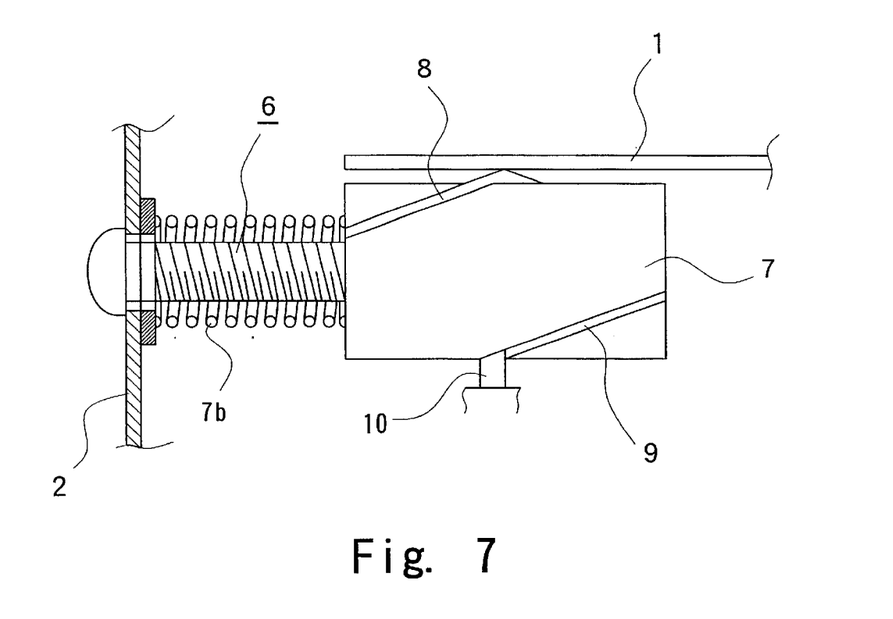
FIG. 7 is a right side view illustrating a manner in which the first embodiment of the mechanism for adjustable installation operates.
Figure 8:
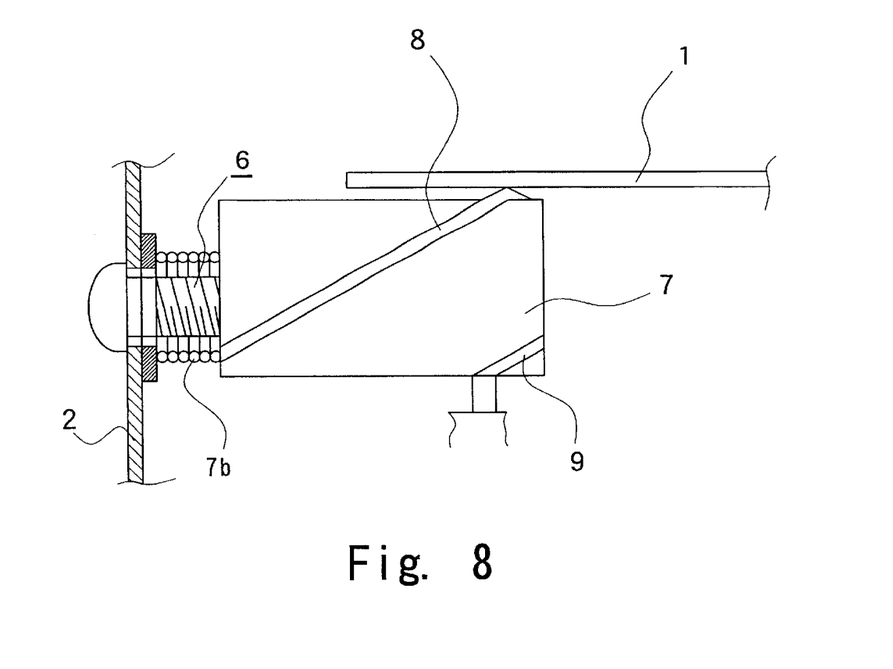
FIG. 8 is a right side view illustrating a manner in which the first embodiment of the mechanism for adjustable installation operates as the mechanism is in a state different from the state illustrated in FIG. 7.

With the reflector 1 having been installed by following the steps as have been described above, the head 6*e* of said actuator screw 6 is rotated using an appropriate tool. Rotation of the actuator screw 6 causes the cam body 7 in engagement with the actuator-threaded portion 6*c* formed around said actuator screw 6 to move back or forth. In this case, the cam body 7 is rotated under the guiding effect of the cam groove 9 as said cam body 7 is moved back or forth since said guide pin 10 is in engagement with said cam groove 9. Specifically, the cam body 7 is moved from the position illustrated in FIG. 7 in the direction depending on the direction in which the actuator screw 6 is rotated and simultaneously said cam body 7 is rotatably guided by said cam groove 9. Rotation of the actuator screw 6 causes said cam ridge 8 to be rotated in the corresponding direction and a position of the reflector 1 at which the reflector 1 comes in contact with said cam ridge 8 is varied, as best seen in FIG. 8. The rotating axis of this cam body 7 is eccentric and therefore a variation of the position of the reflector 1 at which the cam ridge 8 comes in contact with the cam body 7 causes the reflector 1 to swing around said supporting protrusion 3. In this manner, the reflective surface of the reflector 1 can be adjustably oriented by rotating the actuator screw 6. As best seen in FIGS. 5 and 6, the position at which the cam ridge 8 bears against the cam body 7 may be varied to swing the reflector 1 and thereby to vary the direction in which the reflective surface thereof faces, as shown by arrow A.

The presence of said one-side biasing spring 7*b* maintains the cam body 7 at a constant position relative to the actuator screw 6. In addition, the appropriately shaped cam curve described by the cam groove 9 ensures that said cam ridge 8 bears against the reflector 1 always at a constant position on said reflector 1 in a point contact fashion. In this way, installation of the reflector 1 can be stabilized and quantitatively adjusted.

Rotation of the driving screw 15 extending through and engaged with said case holder 12 causes said driving screw 15 to be moved back or forth with respect to said case holder 12 and thereby to thrust said casing 2 or to put said casing 2 under a restoring force of said counter spring 14. In any way, movement of said casing 2 is guided by said guide rods 13. These guide rods 13 longitudinally extend at an angle with respect to the longitudinal direction of the reflector 1, so that said guide rods 13 guide the casing 2 to ascent or to descent. Correspondingly, the reflector 1 mounted on the casing 2 also ascents or descents with its reflective surface being moved in a direction intersecting said reflective surface. In this way, an optical path length in the entire optical system can be adjusted.

Figure 9:
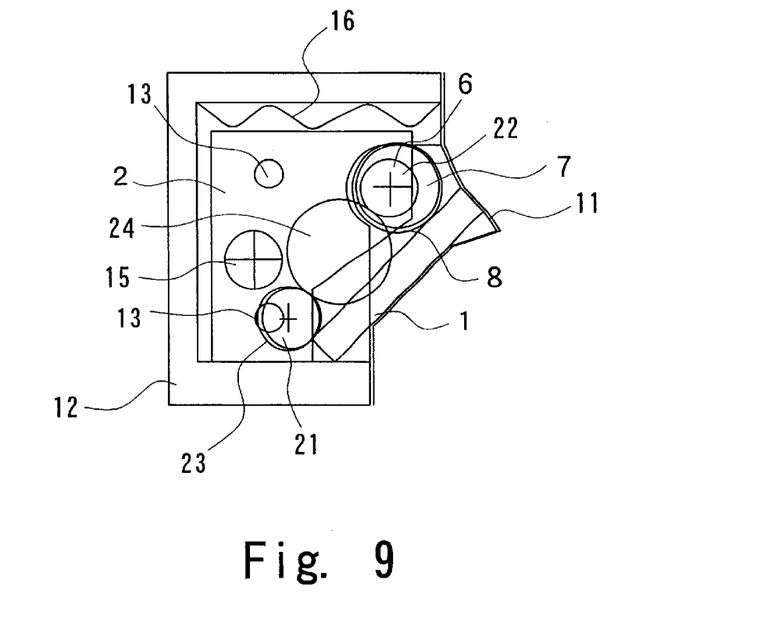
FIG. 9 is a front view schematically illustrating an important construction in a second embodiment of the mechanism for adjustable installation of the plate-like member according to this invention.
Figure 10:
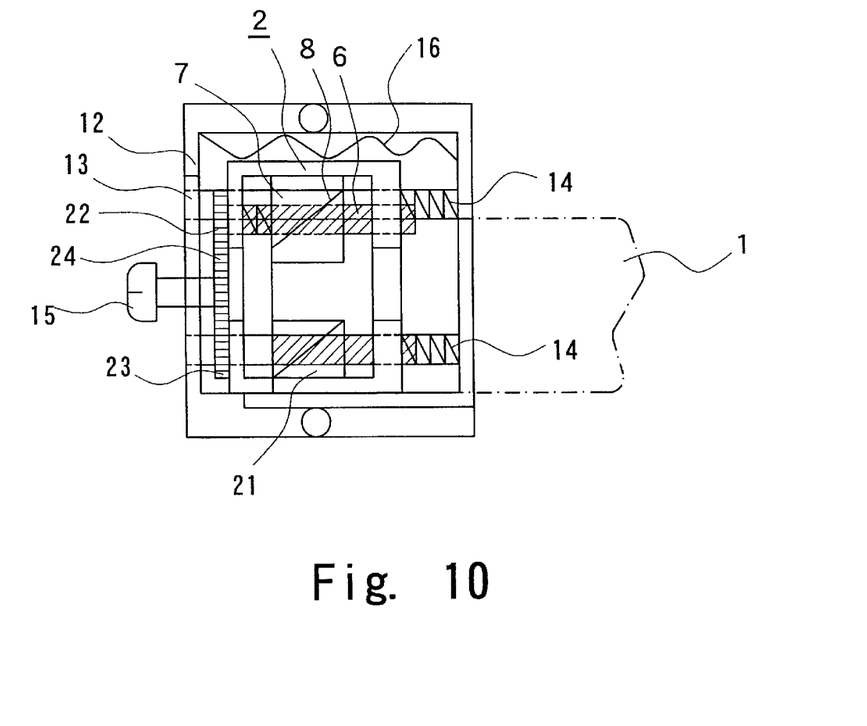
FIG. 10 is a plan view of the mechanism for adjustable installation of FIG. 9.

FIGS. 9 and 10 schematically illustrate an important construction in a second embodiment of the novel mechanism for adjustable installation of the plate-like member, in which the regions as well as the members similar to those in the first embodiment illustrated in FIGS. 1–7 are designated by similar reference numerals. This second embodiment is distinguished from the first embodiment in that said supporting protrusion 3 is replaced by a supporting cam 21 adapted to be rotatably driven in operative association with rotation of the cam body 7. To this end, a driving gear 22 is mounted on said actuator screw 6, on one hand, and a driven gear 23 is mounted on a driving shaft of said supporting cam 21, on the other hand, and an intermediate gear 24 is disposed between these two gears 22, 23 so as to be operatively engaged with these two gears 22, 23.

With such arrangement, the driving gear 22 is rotated as the actuator screw 6 is rotated in order to rotate said cam body 7. Rotation of said driving gear 22 is transmitted via the intermediate gear 24 to the driven gear 23. Rotation of this driven gear 23 causes said supporting cam 21 to rotate since said driven gear 23 is mounted on the driving shaft for said supporting cam 21. One transverse end of the reflector 1 is normally biased to bear against this supporting cam 21 so that said transverse end is moved as the supporting cam 21 is rotated and varies the direction in which the reflective surface of the reflector 1 faces. The other transverse end of the reflector 1 bearing against the cam body 7 is also moved as said cam body 7 is rotated. Consequently, the movements of the reflector's transversely opposite ends are moved substantially synchronized. In this way, the direction in which the reflective surface faces can be quickly adjusted and operation for adjustable installation of the reflector 1 can be correspondingly simplified.

Figure 11:
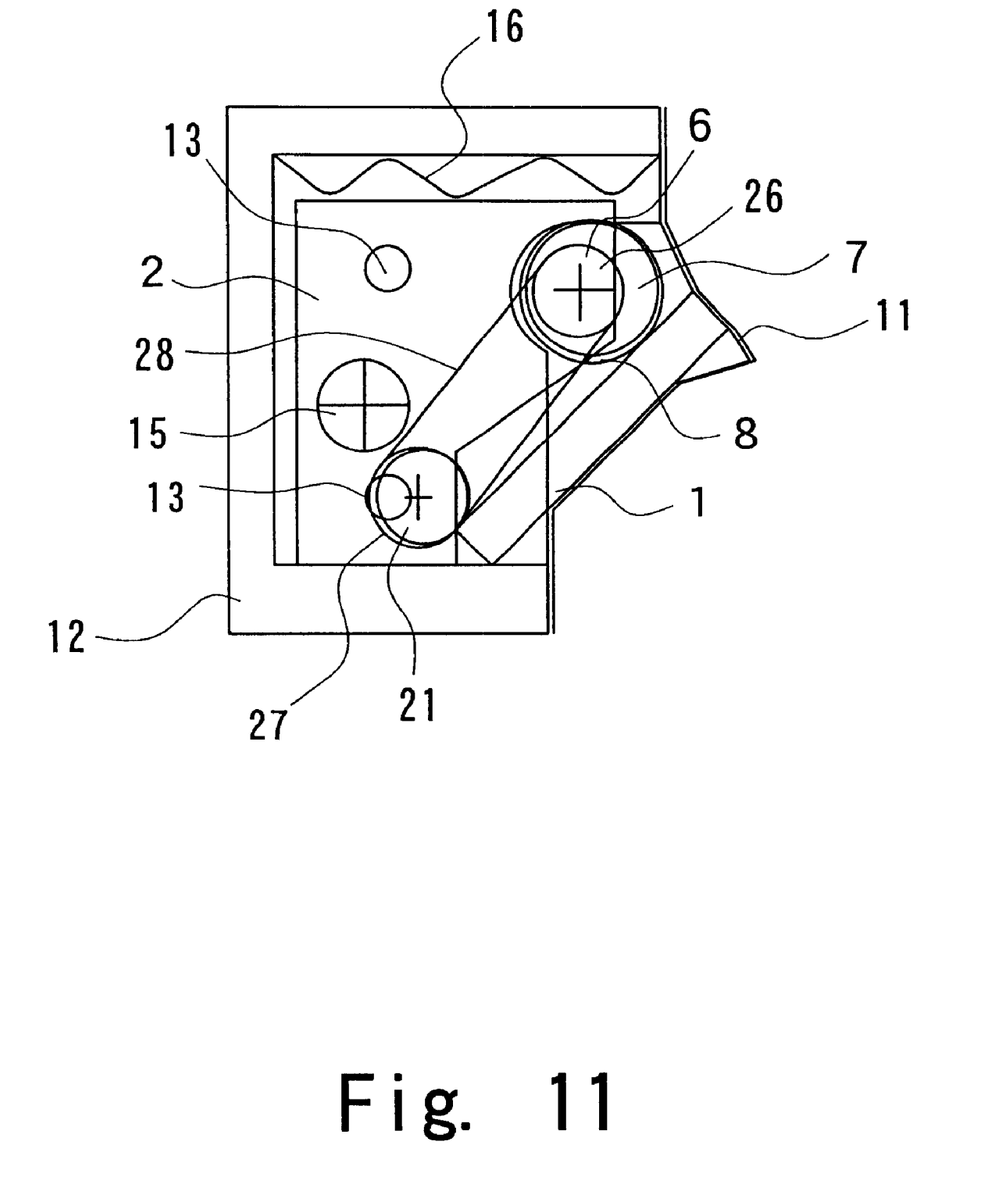
FIG. 11 is a view similar to FIG. 9 illustrating a variant of the second embodiment.

FIG. 11 illustrates a variant of said second embodiment, in which a power transmission between said cam body 7 and supporting cam 21 is achieved by using a belt pulley. To this end, a driving pulley 26 is mounted on the actuator screw 6 of the cam body 7, on one hand, and a driven pulley 27 is mounted on the driving shaft of said supporting cam 21, on the other hand, so that these two pulleys 26, 27 may be operatively associated with each other by a belt 28 draped about them. With such arrangement, the cam body 7 may be rotated to rotate the supporting cam 21 and thereby to move the transversely opposite ends of the reflector 1 substantially in a synchronized relationship.

Figure 12:
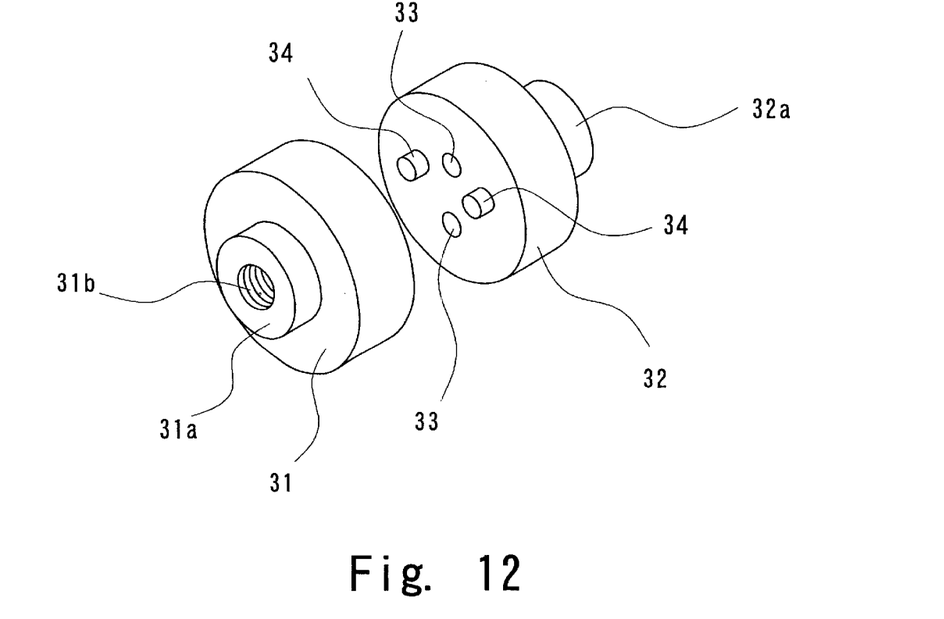
FIG. 12 is an exploded perspective view schematically illustrating an important construction in a third embodiment of the mechanism for adjustable installation of the plate-like member according to this invention.
Figure 13:
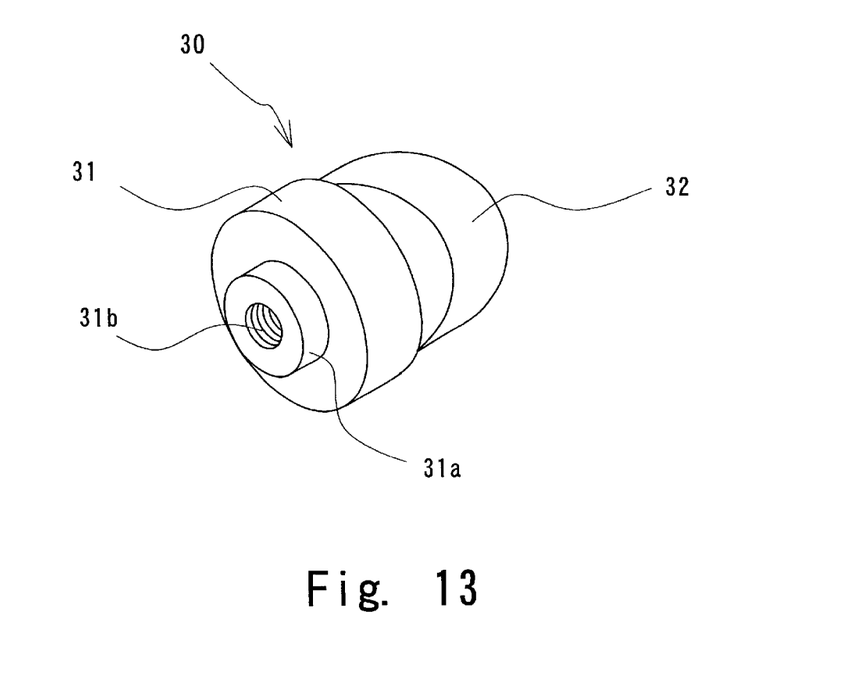
FIG. 13 is a diagram illustrating said important construction illustrated in FIG. 12 as after assembled.

Now a third embodiment will be described in reference with FIGS. 12–14. As best-seen in FIG. 13, this embodiment is characterized in a pair of cylindrical cams 31, 32 assembled with each other in a unique manner. These cams 31, 32 are eccentric cams axially confronting and coupled to each other with a phase shift, for example, of 90° between these eccentric cams 31, 32. These cams 31, 32 are assembled with each other by means of knock pin holes 33 and knock pins 34 provided in and on mutually confronting surfaces of the these cams 31, 32. Each of the knock pin holes 33 of the one cam 31, 32 is adapted to receive a desired one of the knock pins 34 projecting from the other cam 32, 31 and thereby to establish a desired phase shift between these two cams 31, 32. Correspondingly, each of the knock pin holes 33 of the other cam 32, 31 is adapted to receive one of the knock pins 34 projecting from said one cam 31, 32. These cams 31, 32 are formed on their surfaces which do not confront each other with shafts 31a, 32a, respectively. These shafts 31a, 32a are eccentric to respective center axes of the cams 31, 32 so that these cams 31, 32 may function as the eccentric cams 31, 32, respectively. Said shafts 31a, 32a come in alignment with each other as said cams 31, 32 are properly assembled together. The shaft 31a is centrally formed with a female threaded hole 31b.

Figure 14:
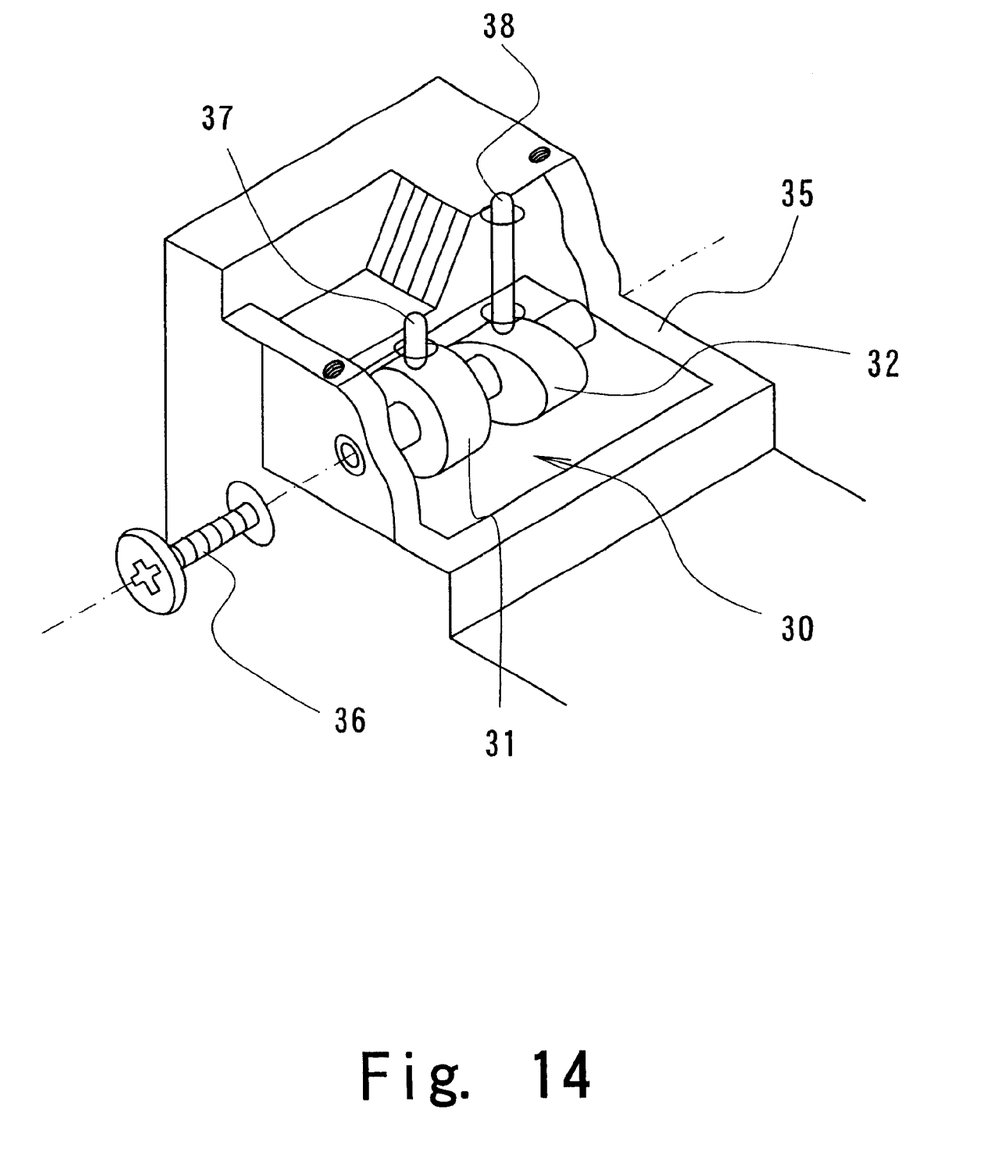
FIG. 14 is a perspective view schematically illustrating an important construction in the third embodiment of the mechanism for adjustable installation.

A cam assembly 30 comprising a combination of these cams 31, 32 has said shafts 31a, 32a supported by a casing 35 so that respective axes of said shafts 31a, 32a extend in parallel to the transverse direction of the reflector 1, as will be best seen in FIG. 14. An actuator screw 36 extends through the casing 35 and is screwed into the female threaded hole 31b of said shaft 31a supported by said casing 35. Though not illustrated, the cam 31 is formed with a cam groove adapted to be engaged with a guide pin provided on the casing just like in the first embodiment.

The casing 35 includes a pair of vertically movable follower rods 37, 38 having respective proximal ends bearing against the cam surfaces of the associated cams 31, 32 and respective distal ends extending slightly above the casing 35. Once the reflector 1 has been installed in the casing 35, the reflector 1 is normally kept in contact with the distal ends of these follower rods 37, 38 at points lying on the transversely opposite ends of the reflector 1, respectively.

With the mechanism for adjustable installation according to this third embodiment, rotation of the actuator screw 36 causes the cam assembly 30 to rotate and thereby causes said follower rods 37, 38 to move the end of the reflector 1. As a result, said reflector 1 has its reflecting surface adjustably oriented. The reflector 1 bears against the follower rods 37, 38 in a point-contact fashion which enables the reflector 1 to be position- and/or orientation-adjusted without any anxiety of instability.

While the first-third embodiments have been described above with respect to the plate-like member in the form of the reflector 1, it will be obviously understood that the plate-like member is not limited to the reflector 1 but may take the form of the CCD (charge coupled device) or the photosensor. In this case, the orientation of the CCD or the photosensor can be adjusted by the mechanism according to this invention with respect to the beam entering said CCD or photosensor.

As will be apparent from the foregoing description, the novel mechanism for adjustable installation of the plate-like member enables the adjustment to be quantitatively performed by keeping the plate-like member in contact with the cam member so that said plate-like member may have its effective surface adjustably orientated as said cam member is moved. In addition, the novel mechanism enables the adjustment to be more finely performed than by use of an adjusting screw or an eccentric pin and enables the recently used various precision machines also to be reliably adjusted since the adjustment is achieved in accordance with the continuous cam curve. Particularly for said plate-like member in the form of the reflector installed in the optical scanner, the optical path defined in this optical scanner can be reliably adjusted.

The cam member is moved along its rotational axis as said cam member rotates and therefore a movement of the cam member along said rotational axis per its unit angular movement may be appropriately set to ensure that the plate-like member bears against the cam curve at predetermined position on said plate-like member. In this way, installation of the plate-like member can be quantitatively adjusted.

Said actuator means comprising the actuator screw is operatively engaged with the cam member so that the rotational shaft of said cam member may have its axial direction substantially coincident with the feed direction of said actuator screw. Said cam member is formed with the appropriate cam curve adapted to be engaged with said guide pin so that said cam curve may be appropriately configured and thereby the position of the plate-like member at which the plate-like member comes in contact with said cam curve may be easily predetermined.

A pair of said cam members are provided at one longitudinal end of the plate-like member with the cam curves of the respective cam members normally bearing against the one surface of said plate-like member while the other surface of said plate-like member is normally biased to keep said one surface in contact with said pair of cam curves under the effect of the biasing means. The actuator means rotatably drives said cam members and thereby moves the transversely opposite ends of the plate-like member so that the effective surface of said plate-like member may be adjustably oriented. Such unique arrangement enables the adjustment to be rapidly carried out and simplifies the operation for this adjustment.

Said pair of cam members have their rotational shafts extending substantially in parallel to each other so that rotation of the one cam member may cause the other cam member to be rotated in synchronization with the rotation of said one cam member via the transmission means. Such arrangement also facilitates the operation of adjustment.

Alternatively, said pair of cam members are coaxial with each other and present different cam curves, respectively, so that these cam members may be rotatably driven by said actuator means. This alternative arrangement makes it unnecessary to provide any transmission means between said pair of cam members and simplifies the mechanism by reducing the number of parts.

It is also possible to form said pair of cam members with respective cam curves having the respective configurations which are identical with each other but being phase-shifted from each other so that these cam members may be rotatably driven by said actuator means. The identical configuration of the cam curves not only simplifies working of the cam members but also facilitate quality control of the respective parts.

The casing receiving said cam members is movable in the direction orthogonal to the longitudinal direction of said plate-like member so that the cam members themselves may be moved in said direction orthogonal to the longitudinal direction of said plate-like member to desired positions. In this way, the plate-like member itself can be moved and thereby its position relative to the remaining parts can be easily adjusted.

There are provided the follower rods each having one end normally kept in contact with the cam curve of the associated one of said cam members and the other end normally bearing against said plate-like member. The point-contact with the cam members is established, which ensures the mechanism to operate without any anxiety of instability.

Particularly for said plate-like member in the form of the reflector installed within the optical scanner, the reflecting direction of this reflector as well as the direction of the relevant optical path can be easily and quantitatively adjusted. Thus various factors of said optical scanner such as optical path, optical characteristics and scanning characteristics can be easily preadjusted.

What is claimed is:

1. A mechanism for adjustable installation of a plate member comprising:

a plate member having longitudinally opposite ends and first and second surfaces on opposite sides;

a cam member located at one of said longitudinally opposite ends of said plate member aside to one of transversely opposite ends of said plate member so that a cam curve of said cam member is in contact with said first surface of said plate member;

a pivot connection for pivotally supporting said plate member at the other of said transversely opposite ends;

biasing means to bias said second surface of said plate member so that said first surface of said plate member is kept in contact with said cam curve; and actuator means to rotate said cam member to alter the position of said plate member as said cam curve engages said first surface, wherein said actuator means includes a rotational shaft and wherein said cam member moves in the axial direction of its rotational shaft as said cam member rotates, and wherein said actuator means comprises an actuator screw threadably engaged with said cam member, said actuator screw having its feed direction substantially coincident with said rotational shift of said cam member which includes a cam curve, and said mechanism further comprises a guide member adapted to be engaged with said cam curve.

2. A mechanism for adjustable installation of a plate member comprising:

a plate member having longitudinally opposite ends and first and second surfaces on opposite sides, wherein said plat member is a reflector for installation within an optical scanning apparatus;

a cam member located at one of said longitudinally opposite ends of said plate member aside to one of transversely opposite ends of said plate member so that a cam curve of said cam member is in contact with said first surface of said plate member;

a pivot connection for pivotally supporting said plate member at the other of said transversely opposite ends;

biasing means to bias said second surface of said plate member so that said first surface of said plate member is kept in contact with said cam curve; and actuator means to rotate aid cam member to alter the position of said plate member as said cam curve engages said firs surface.

3. The mechanism according to claim 2, and further including a casing adapted to receive said cam member, and said cam member is movable in the direction orthogonal to the longitudinal direction of said plate member.

4. The mechanism according of claim 2, and further comprising at least one follower rod having one end in contact with said cam curve of said cam member and the other end in contact with said plate member.

5. A mechanism for the adjustable installation of a reflector plate for use with an optical scanner comprising:

a casing;

a reflector plate having longitudinally spaced opposite ends and first and second surfaces on opposite sides of said plate, said plate having a pivot connection at one end to said casing;

a cam member rotatably mounted to said casing at a position aligned with an end of said reflector plate opposite said pivot connection of said plate and said casing, said cam member having a cam curve which engages said first surface of said reflector plate;

biasing means for biasing said reflector plate in a direction such that said first surface of said plate member is maintained in contact with said cam curve; and an actuator for rotating said cam member on an axis of rotation to tilt said reflector plate about said pivot connection as said cam curve engages said first surface.

6. The mechanism according to claim 5, wherein said actuator means includes a rotational shaft coupled to said cm member.

7. The mechanism according to claim 6, wherein said actuator means comprises an actuator screw threadably engaged with said cam member, said actuator screw having its feed direction substantially coincident with the axis of rotation of said cam member.

8. The mechanism according to claim 7, wherein said cam further includes a groove and said casing includes a guide pin slidably extending into said groove.

* * * * *

UNITED STATES PATENT AND TRADEMARK OFFICE
CERTIFICATE OF CORRECTION

PATENT NO. : 6,585,446 B2
DATED : July 1, 2003
INVENTOR(S) : Koji Kaneko

It is certified that error appears in the above-identified patent and that said Letters Patent is hereby corrected as shown below:

<u>Column 3,</u>
Line 1, "means," should be -- means. --.

<u>Column 4,</u>
Line 14, after "rotated" insert -- in --.

<u>Column 5,</u>
Line 11, after "After" insert -- it --.
Line 32, "member" should be -- members --.

<u>Column 6,</u>
Line 32, delete "bans".

<u>Column 7,</u>
Line 40, "potion" should be -- portion --.
Line 49, after "rods" delete -- . --.

<u>Column 9,</u>
Line 53, before "these" delete -- the --.

<u>Column 11,</u>
Line 38, "facilitate" should be -- facilitates --.

<u>Column 12,</u>
Line 42, "aid" should be -- said --.
Line 44, "firs" should be -- first --.
Line 50, "of" should be -- to --.

UNITED STATES PATENT AND TRADEMARK OFFICE
CERTIFICATE OF CORRECTION

PATENT NO.    : 6,585,446 B2
DATED         : July 1, 2003
INVENTOR(S)   : Koji Kaneko It is certified that error appears in the above-identified patent and that said Letters Patent is hereby corrected as shown below:

<u>Column 13,</u>
Line 8, "cm" should be -- cam --.

Signed and Sealed this

Eleventh Day of November, 2003

JAMES E. ROGAN
*Director of the United States Patent and Trademark Office*